United States Patent
Dandurand et al.

(10) Patent No.: US 9,308,952 B2
(45) Date of Patent: *Apr. 12, 2016

(54) DRIVE TRACK FOR SNOWMOBILE OR TRACKED VEHICLE

(71) Applicant: CAMOPLAST SOLIDEAL INC., Sherbrooke (CA)

(72) Inventors: Jules Dandurand, Sherbrooke (CA); Denis Courtemanche, Richmond (CA)

(73) Assignee: CAMSO INC., Magog, Qc (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,643

(22) Filed: Aug. 11, 2014

(65) Prior Publication Data

US 2015/0035354 A1 Feb. 5, 2015

Related U.S. Application Data

(63) Continuation of application No. 13/307,816, filed on Nov. 30, 2011, now Pat. No. 8,833,873, which is a continuation of application No. 11/797,267, filed on May 2, 2007, now Pat. No. 8,083,296, which is a continuation-in-part of application No. 11/434,057, filed on May 16, 2006, now Pat. No. 7,823,987.

(51) Int. Cl.
  *B62D 55/24* (2006.01)
  *B62D 55/26* (2006.01)
  *B62D 55/06* (2006.01)
  *B62M 27/02* (2006.01)

(52) U.S. Cl.
  CPC ............... *B62D 55/24* (2013.01); *B62D 55/06* (2013.01); *B62D 55/244* (2013.01); *B62D 55/26* (2013.01); *B62M 27/02* (2013.01); *B62M 2027/027* (2013.01)

(58) Field of Classification Search
  CPC ........ B62D 55/00; B62D 55/08; B62D 55/24; B62D 55/244
  USPC .......... 305/157–158, 165–184; 474/260–262, 474/266–267
  See application file for complete search history.

(56) References Cited

U.S. PATENT DOCUMENTS

| | | | |
|---|---|---|---|
| 1,924,354 A | 8/1933 | Freedlander |
| 2,793,150 A | 5/1957 | Deaves |
| 3,480,339 A | 11/1969 | Kell |
| 3,485,707 A | 12/1969 | Spicer |
| 3,704,918 A | 12/1972 | Perreault |
| 3,712,689 A | 1/1973 | Chaumont |
| 3,721,477 A | 3/1973 | Cooper et al. |
| 3,858,948 A | 1/1975 | Johnson et al. |
| 5,145,242 A | 9/1992 | Togashi |
| 5,380,076 A | 1/1995 | Hori |
| 5,593,218 A | 1/1997 | Katoh et al. |
| 5,730,510 A | 3/1998 | Courtemanche |
| 6,007,912 A | 12/1999 | Doujak |
| 6,109,705 A | 8/2000 | Courtemanche |
| 6,203,125 B1 | 3/2001 | Arakawa et al. |
| 6,406,655 B1 | 6/2002 | Courtemanche |
| 6,811,877 B2 | 11/2004 | Haislet et al. |
| 7,304,006 B2 | 12/2007 | Lee et al. |
| 7,823,987 B2 | 11/2010 | Dandurand et al. |
| 8,083,296 B2 | 12/2011 | Dandurand et al. |
| 8,833,873 B2 * | 9/2014 | Dandurand et al. .......... 305/166 |

(Continued)

*Primary Examiner* — Jason Bellinger

(57) ABSTRACT

A track formed of a molded rubber base sandwiching a cord layer and a single layer of ply fabric extending longitudinally of the track.

56 Claims, 10 Drawing Sheets

(56) References Cited

U.S. PATENT DOCUMENTS

| | | |
|---|---|---|
| 2001/0009336 A1 | 7/2001 | Hori |
| 2002/0067074 A1 | 6/2002 | Katayama et al. |
| 2002/0175563 A1 | 11/2002 | Katayama |
| 2006/0105874 A1 | 5/2006 | Shimamura |

\* cited by examiner

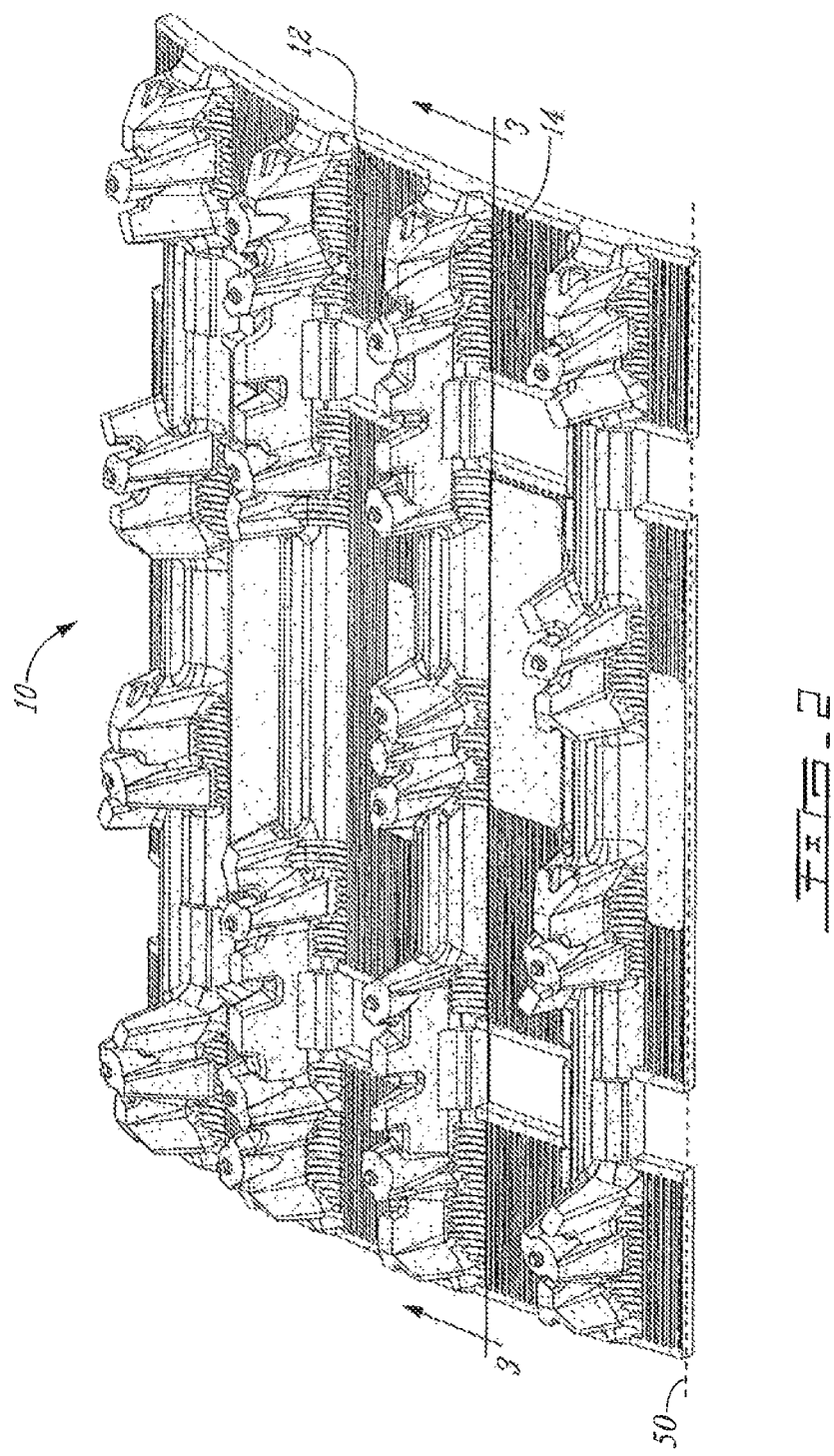

DRIVE TRACK FOR SNOWMOBILE OR TRACKED VEHICLE

CROSS REFERENCE TO RELATED APPLICATIONS

This application is a continuation of U.S. patent application Ser. No. 13/307,816 filed on Nov. 30, 2011, now U.S. Pat. No. 8,833,873, which is a continuation application of U.S. patent application Ser. No. 11/797,267 filed on May 2, 2007, now U.S. Pat. No. 8,083,296, which is a continuation-in-part application of U.S. patent application Ser. No. 11/434,057 filed on May 16, 2006, now U.S. Pat. No. 7,823,987, which itself claims priority on Canadian application no. 2,509,059, filed on Jun. 2, 2005. All documents above are herein incorporated by reference.

FIELD OF THE INVENTION

The present invention pertains to a drive track and, more particularly, to a track for snowmobiles or other tracked vehicles, having an improved construction to decrease horse power, increase top speed and improve durability of the track when the latter is driven at high rotational speeds.

BACKGROUND OF THE INVENTION

Endless drive tracks for propelling, for example, a snowmobile over snow, ice or other similar ground structure, are known in the art. The mounting of this track to a snowmobile and the mounting of such track on an all-terrain vehicle are well known. The track has a ground engaging outer side and an inner side that receives and supports, on the lower run thereof, a suspension which may consist of a wheel assembly or a slide rail assembly, both of which are also well known in the art.

Conventionally, the track rotates by means of a motor driven sprocket unit at the forward end of the vehicle and idle drive wheels are mounted at the aft end of the vehicle to support the rear end of the track. Sprockets engage a series of lugs integrally formed with the inner surface of the track.

With reference to FIG. 1, the endless body is generally formed of a molded rubber base having, embedded therein, a first layer of reinforcing fabric 38 extending longitudinally of the track, a series of laterally spaced cord strands 40 which extend between the first layer of fabric and beneath a rod 34, and a second ply 36 fabric disposed above the rod 34. Such arrangement has been shown to allow good track performance and longevity. It is generally believed that an increased amount of fabric contributes these performances. In areas of the track where there is no rod, it is about at mid-thickness of the track where the fiber of the rubber is the strongest, this line of zero stress in cross section of the track separating the region of compressive stress from that of tensile stress being known as the neutral fiber.

In spite of efforts in this field, there is still a need for a lighter, cost effective track.

SUMMARY OF THE INVENTION

More specifically, there is provided a track for a tracked vehicle, comprising a molded rubber base sandwiching a cord layer and a single layer of ply fabric extending at least in parts longitudinally in the rubber base.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 2 is a perspective view of a portion of a track according to an embodiment of the present invention;

FIGS. 3A-3F are cross-sectional views of track according to different embodiments of the present invention;

DESCRIPTION OF EMBODIMENTS OF THE INVENTION

As shown in FIG. 2, a track 10 according to an embodiment of the present invention comprises a ground engaging outer side 12 and an inner side (not seen in FIG. 2).

Figure 1:
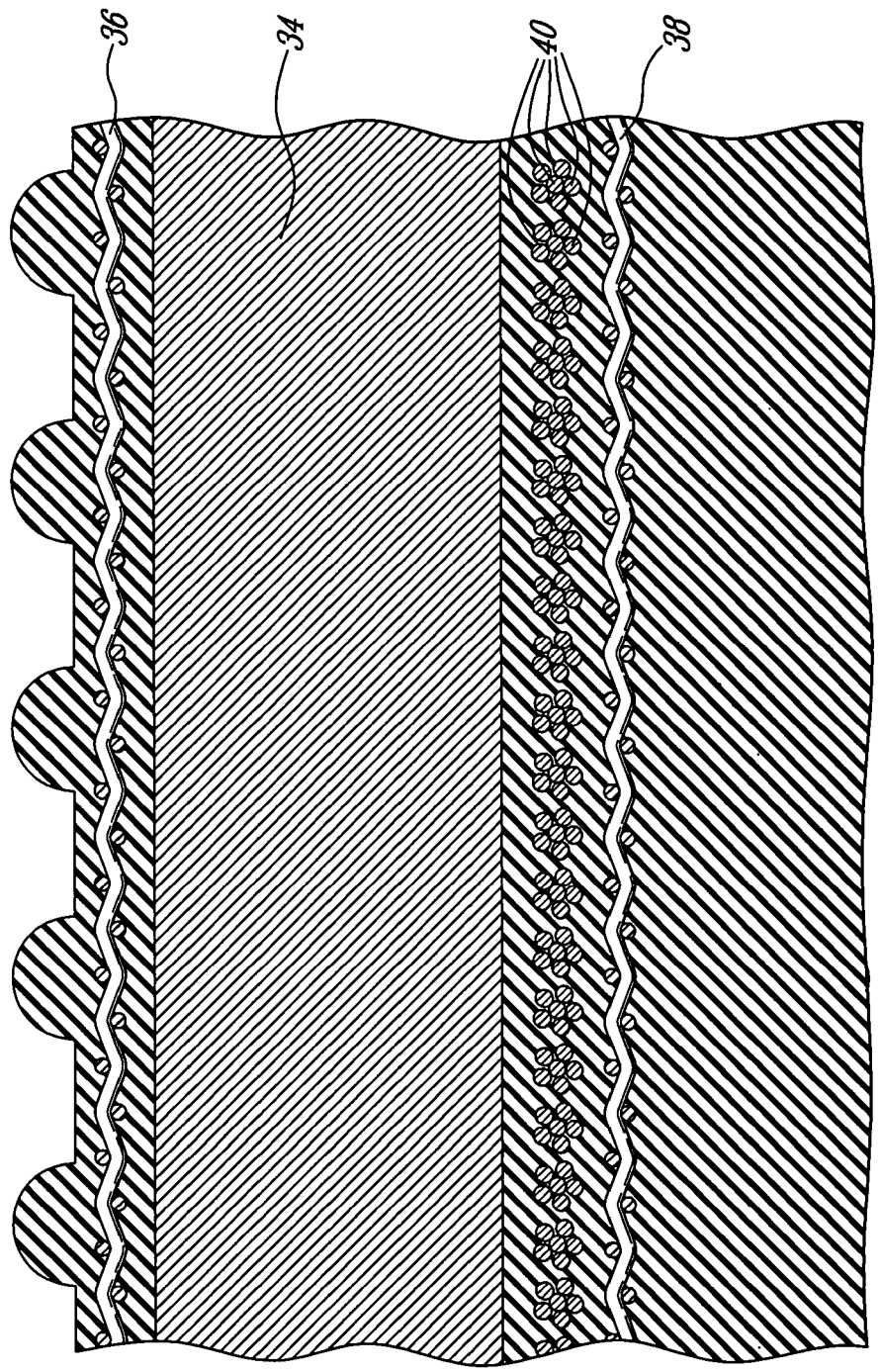
FIG. 1 is a cross section of a track as known in the art.
Figure 3A:
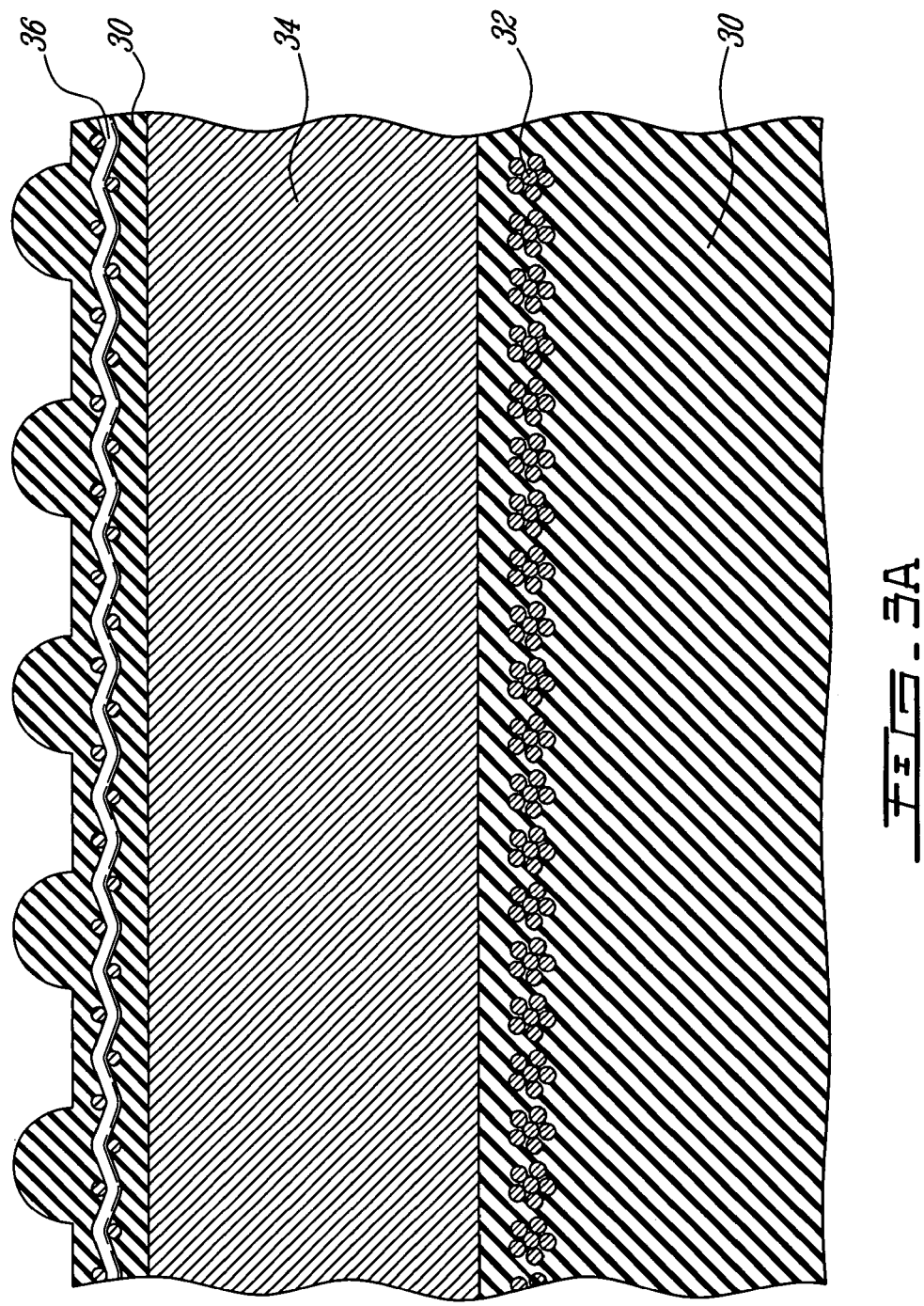

As seen in the cross-section of FIG. 3A, the track 10 is formed of a molded rubber base 30 sandwiching a cord layer 32, a cross bar 34 and a top layer of ply fabric 36 extending longitudinally.

The cross bar 34 may consists of a rod as known in the art, made of composite material for example. It is located at spaced intervals along the longitudinal direction of the track beneath the profiles 14 projecting from the outer side 12 of the track.

The cord layer 32 comprises a dense strand arrangement formed of a twist arrangement of strands, comprising for example at least 18 strands per inch for a cord of 1.25 mm. The strands include high strength, light weight materials such as man made fibers, such as Kevlar™, nylon, and polyester fabric for example In FIG. 3A, the cord layer 32 extends in the rubber base 30 and passes beneath the rod 34.

The cord layer 32 may be discontinued at locations of the track where the idler wheels pass.

The top ply of fabric 36 includes woven man-made fibers such as nylon for example.

Figure 3B:
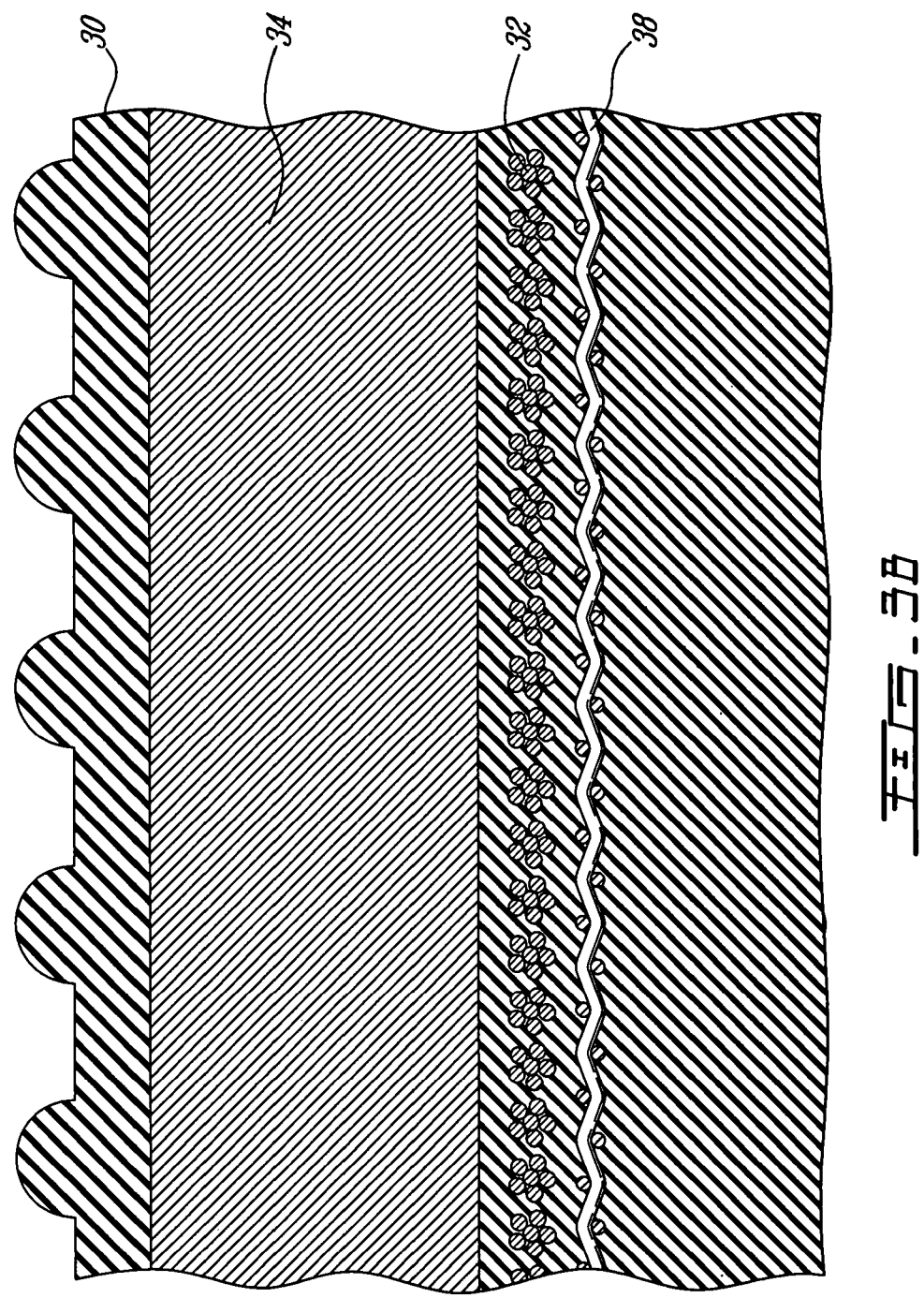

In FIG. 3B, the track is formed of a molded rubber base 30 sandwiching a single layer of ply fabric 38, a cord layer 32 and a cross bar 34. In this embodiment, the bottom ply of fabric 38 lies beneath the cord layer 32, and the region above the cross bar 34 comprises the molded rubber base 30 only.

Figure 3C:
Figure 30:
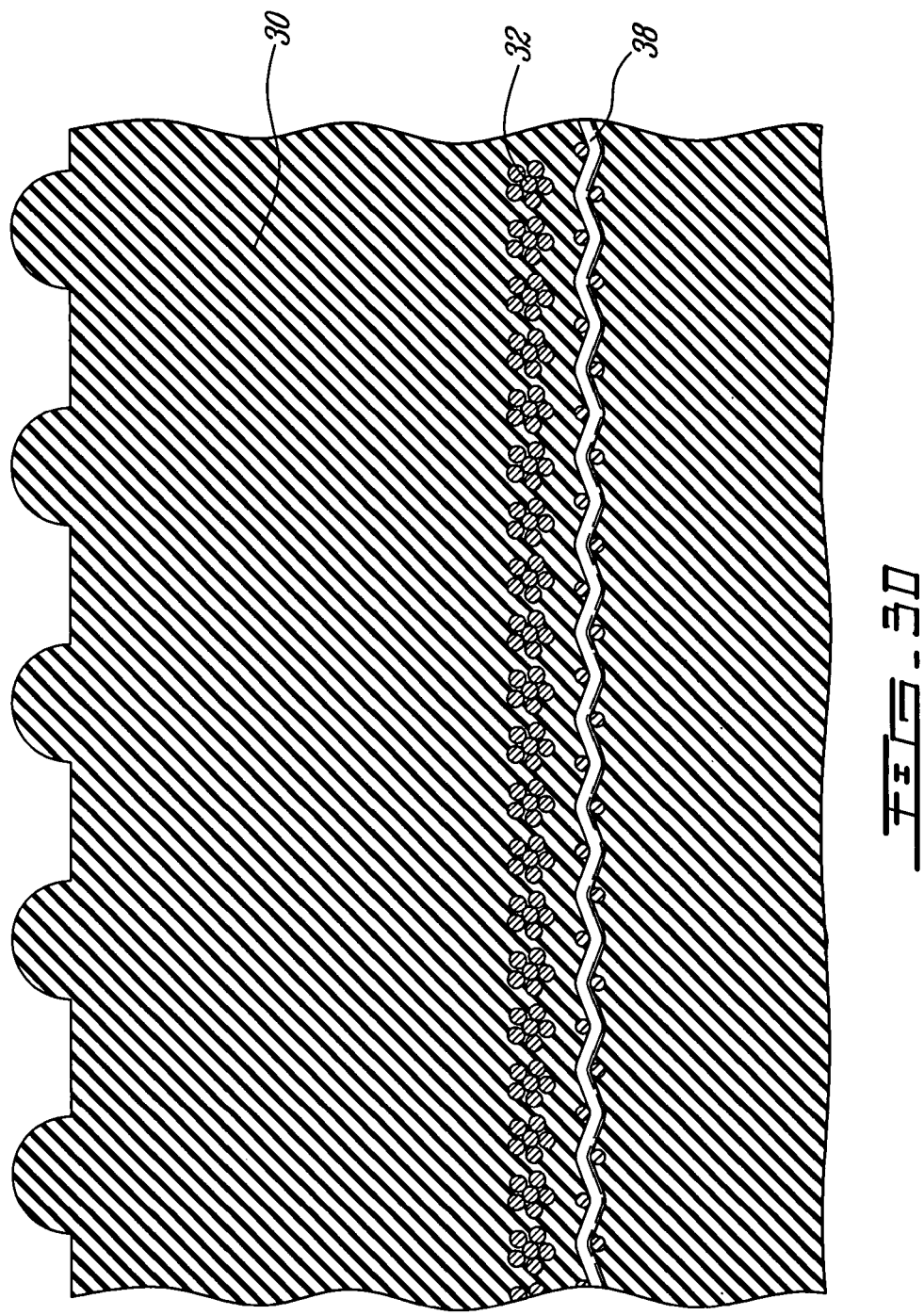

FIGS. 3C and 3D show a track devoid of cross bar, in which the molded rubber base 30 sandwiches a top layer of ply fabric 36 and a cord layer 32, and the molded rubber base 30 sandwiches a bottom layer of ply fabric 38 and a cord layer 32, respectively.

Figure 3E:
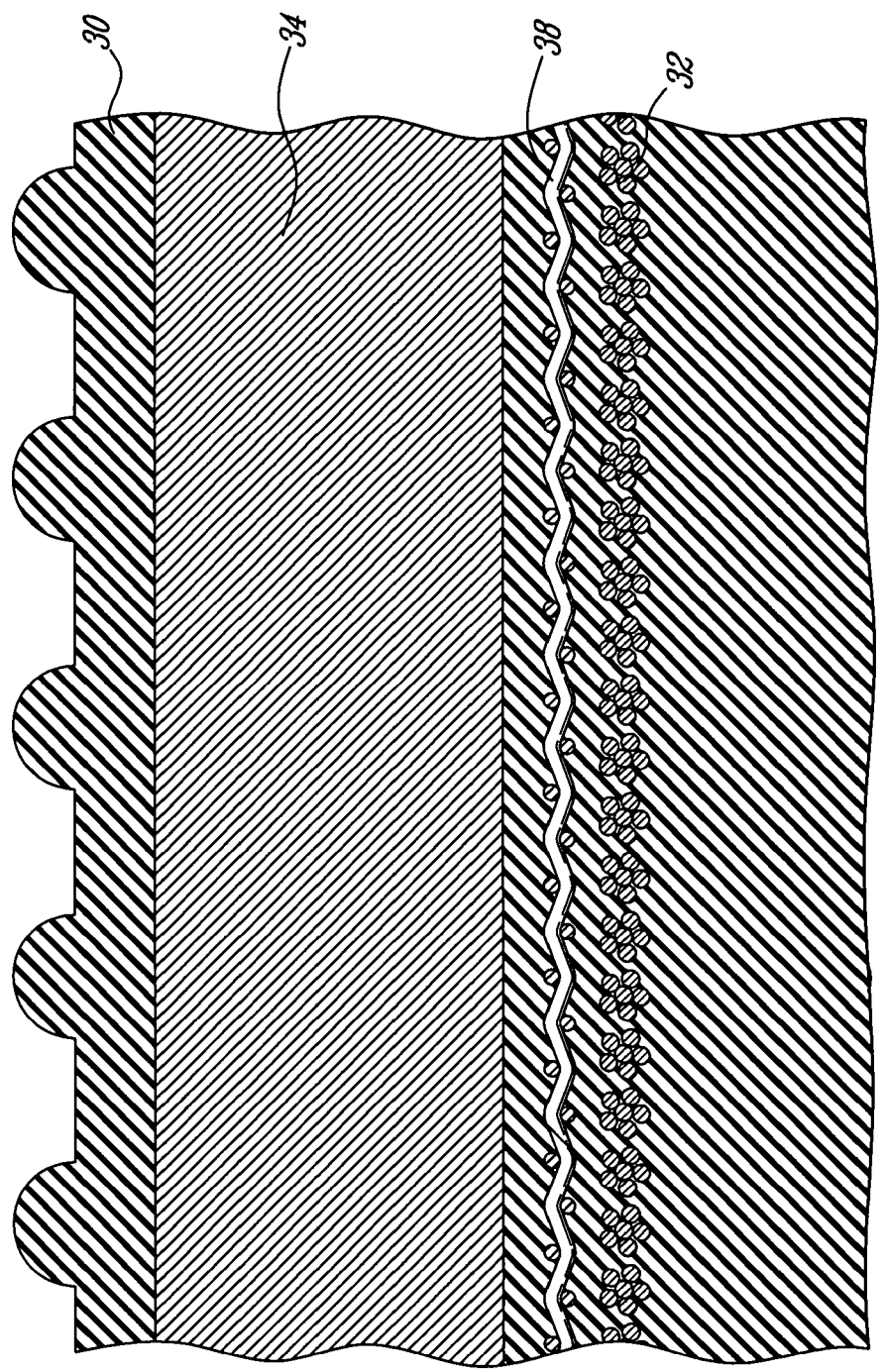

In FIG. 3E, as in FIG. 3B, the track is formed of a molded rubber base 30 sandwiching a cord layer 32, a single layer of ply fabric 38, a cross bar 34, the region above the cross bar 34 comprising the molded rubber base 30 only. In this embodiment, the single layer of ply fabric 38 lies between the cord layer 32 and the cross bar 34.

Figure 3F:
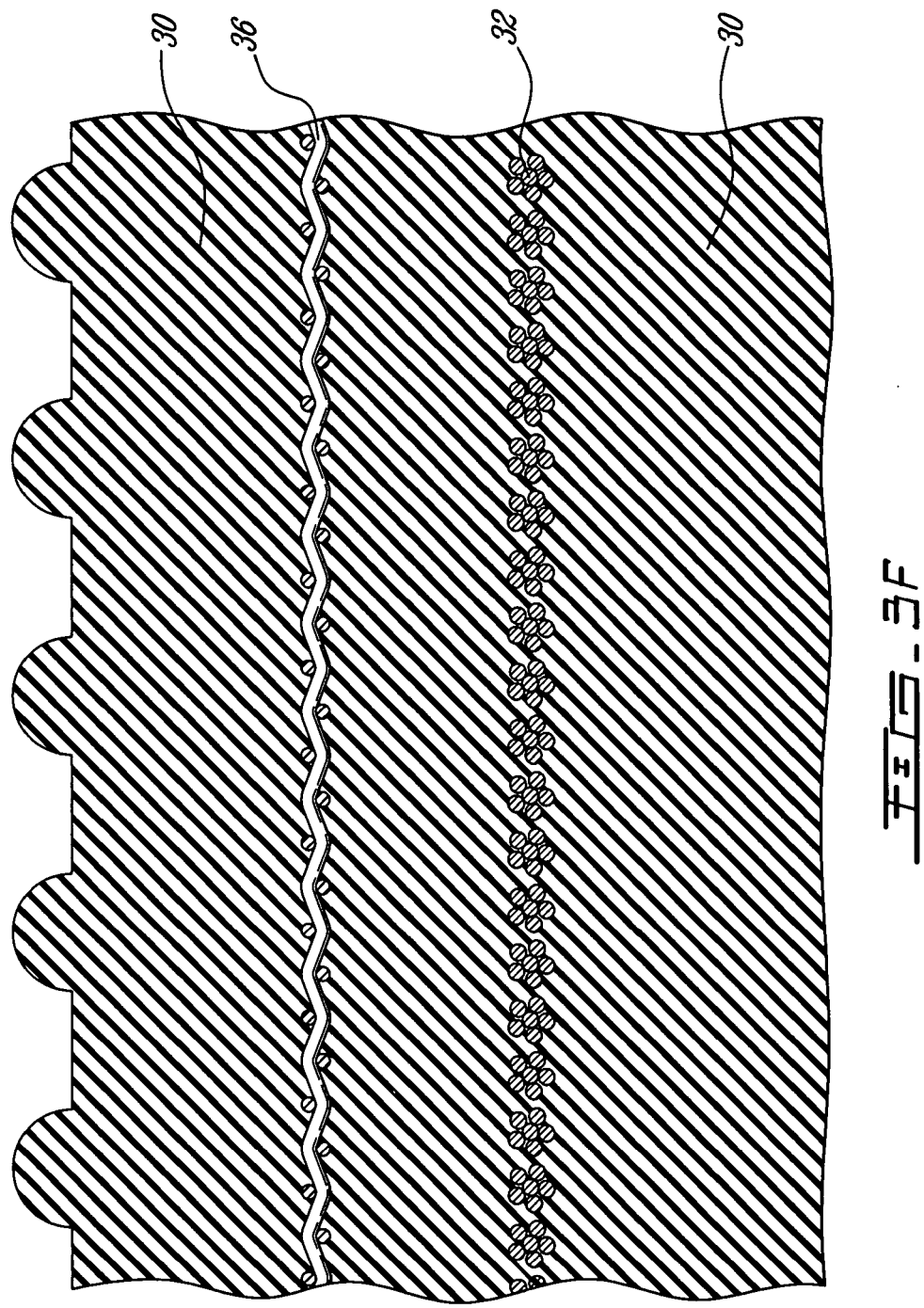

In FIG. 3F, instead of being located near the surface of the rubber base 30 as in FIG. 3C, the single layer of ply fabric 36 is located towards the interior of the rubber base 30.

Figure 4:
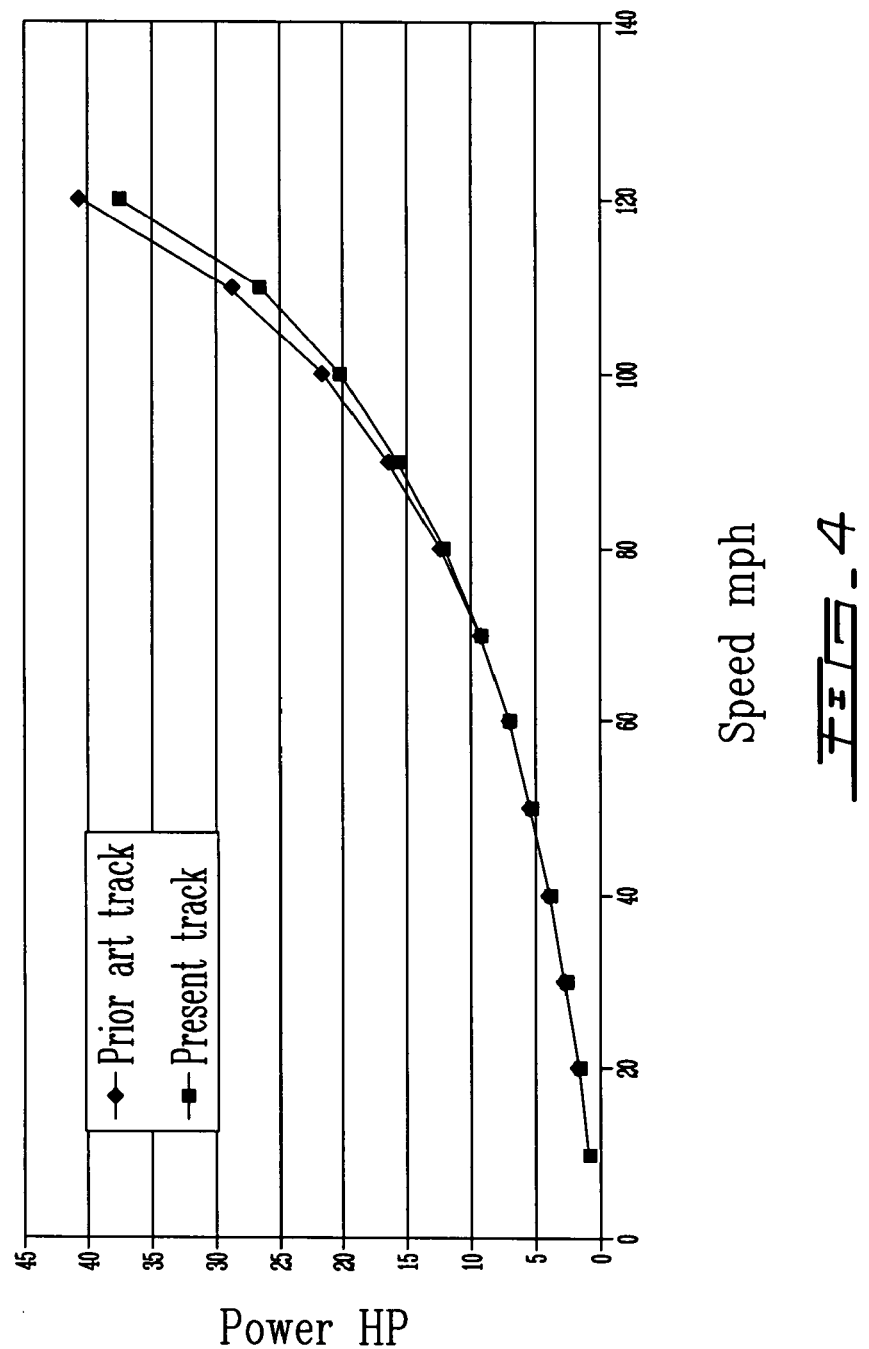
FIG. 4 is a graph of power as a function of speed, used by a track according to the present invention, in a test without traction.
Figure 5:
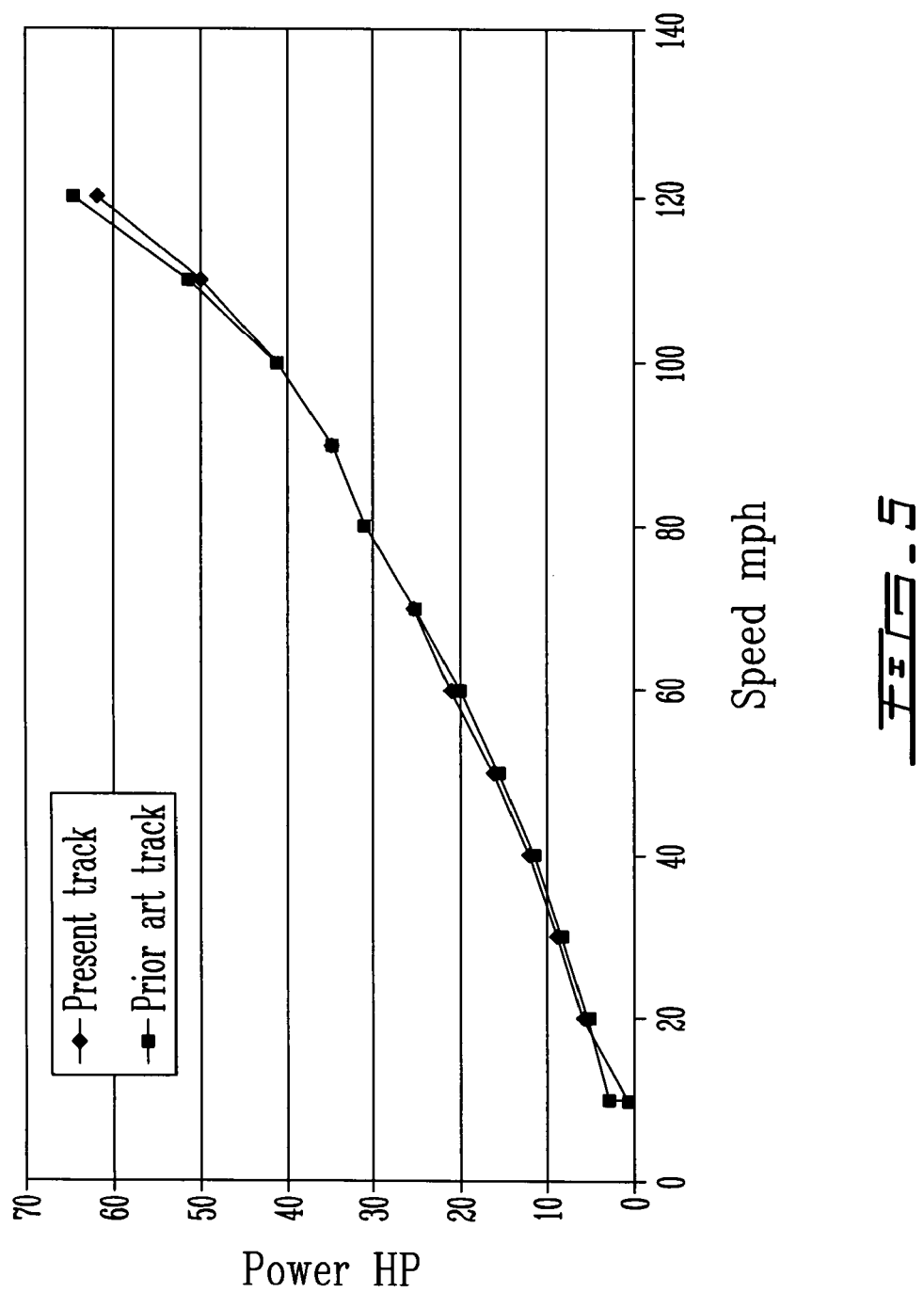
FIG. 5 is a graph of power as a function of speed, used by a track according to the present invention, in a test including traction.

As shown in FIGS. 4 and 5, the present track is found to necessitate equal or less power, which goes against the current belief in the industry that the greater the amount of fabric in the track composition, the better the performances.

People in the art will appreciate that the present invention provides, in contrast to a track standardly made in the art and including an arrangement of rubber, a first ply fabric, cord, rod, second ply fabric and rubber, a track comprising a single layer of ply fabric, yielding a track of reduced thickness, weight and cost, while maintaining target performances thereof in terms of power and longevity. In particular, the present composition is shown to decrease horse power, increase top speed and improve durability of the track when the latter is driven at high rotational speeds. It has also been found to optimize the so-called neutral fiber 50 bringing it closer to the outer side of the track.

The present track may be used for a range of tracked vehicles.

Although the present invention has been described hereinabove by way of embodiments thereof, it may be modified, without departing from the nature and teachings of the subject invention as defined in the appended claims.

What is claimed is:

1. A track for traction of a vehicle, the track being rubber-based and comprising:
    an inner side for facing a drive wheel to impart motion to the track;
    a ground-engaging outer side for engaging the ground on which the vehicle travels, the ground-engaging outer side comprising a plurality of traction projections distributed in a longitudinal direction of the track; and
    a layer of reinforcing fabric embedded between the inner side and the ground-engaging outer side;
wherein a cross-section of the track normal to the longitudinal direction of the track is free of reinforcing fabric between the inner side and the layer of reinforcing fabric and between the ground-engaging outer side and the layer of reinforcing fabric.

2. The track claimed in claim 1, wherein the layer of reinforcing fabric is closer to a given one of the inner side and the ground-engaging outer side than to the other one of the inner side and the ground-engaging outer side in a thickness direction of the track.

3. The track claimed in claim 1, wherein the layer of reinforcing fabric is located such that a neutral area separating a region of compressive stress of the track and a region of tensile stress of the track is closer to a given one of the inner side and the ground-engaging outer side than to the other one of the inner side and the ground-engaging outer side in a thickness direction of the track.

4. The track claimed in claim 1, wherein the layer of reinforcing fabric is closer to the ground-engaging outer side than to the inner side in a thickness direction of the track.

5. The track claimed in claim 1, wherein the layer of reinforcing fabric is located such that a neutral area separating a region of compressive stress of the track and a region of tensile stress of the track is closer to the ground-engaging outer side than to the inner side in a thickness direction of the track.

6. The track claimed in claim 1, comprising a layer of cords embedded between the inner side and the ground-engaging outer side, the cords extending generally parallel to one another and in the longitudinal direction of the track.

7. The track claimed in claim 6, wherein the layer of reinforcing fabric is located between the ground-engaging outer side and the layer of cords.

8. The track claimed in claim 6, wherein the layer of reinforcing fabric is located between the inner side and the layer of cords.

9. The track claimed in claim 6, wherein the layer of reinforcing fabric is spaced apart from the layer of cords in a thickness direction of the endless track.

10. The track claimed in claim 9, wherein a spacing of the layer of reinforcing fabric and the layer of cords in the thickness direction of the track is greater than a thickness of the layer of reinforcing fabric.

11. The track claimed in claim 6, wherein each of the cords comprises a plurality of strands.

12. The track claimed in claim 1, comprising a plurality of cross bars embedded between the inner side and the ground-engaging outer side, spaced apart from one another in the longitudinal direction of the track, and extending transversally to the longitudinal direction of the track.

13. The track claimed in claim 12, wherein the layer of reinforcing fabric is located between the ground-engaging outer side and the cross bars.

14. The track claimed in claim 12, wherein the layer of reinforcing fabric is located between the inner side and the cross bars.

15. The track claimed in claim 12, comprising a layer of cords embedded between the inner side and the ground-engaging outer side, the cords extending generally parallel to one another and in the longitudinal direction of the track.

16. The track claimed in claim 15, wherein the cross bars are located between the layer of cords and the ground-engaging outer side.

17. The track claimed in claim 15, wherein the layer of reinforcing fabric is located between the layer of cords and the cross bars.

18. The track claimed in claim 12, wherein each of the cross bars comprises composite material.

19. The track claimed in claim 1, wherein the layer of reinforcing fabric comprises reinforcing woven fabric.

20. The track claimed in claim 19, wherein the reinforcing woven fabric comprises nylon.

21. The track claimed in claim 1, wherein, when operated at a given speed, the track consumes less power than if the track had an additional layer of reinforcing fabric embedded between the inner side and the ground-engaging outer side and spaced apart from the layer of reinforcing fabric.

22. The track claimed in claim 21, wherein the given speed is above 60 miles per hour.

23. The track claimed in claim 1, wherein respective ones of the traction projections are spaced apart from one another in a widthwise direction of the track.

24. The track claimed in claim 1, wherein each of the traction projections has a height that varies along a longitudinal axis of the traction projection.

25. The track claimed in claim 1, wherein the vehicle is a snowmobile and the track is a snowmobile track.

26. The track claimed in claim 1, wherein the vehicle is an all-terrain vehicle (ATV) and the track is an ATV track.

27. A snowmobile comprising the track claimed in claim 25.

28. An ATV comprising the track claimed in claim 26.

29. A track for traction of a vehicle, the track being rubber-based and comprising:
    an inner side for facing a drive wheel to impart motion to the track; and
    a ground-engaging outer side for engaging the ground on which the vehicle travels, the ground-engaging outer side comprising a plurality of traction projections distributed in a longitudinal direction of the track;

wherein a cross-section of the track normal to the longitudinal direction of the track has a single layer of reinforcing fabric embedded between the inner side and the ground-engaging outer side.

30. The track claimed in claim 29, wherein the single layer of reinforcing fabric is closer to a given one of the inner side and the ground-engaging outer side than to the other one of the inner side and the ground-engaging outer side in a thickness direction of the track.

31. The track claimed in claim 29, wherein the single layer of reinforcing fabric is located such that a neutral area separating a region of compressive stress of the cross-section of the track and a region of tensile stress of the cross-section of the track is closer to a given one of the inner side and the ground-engaging outer side than to the other one of the inner side and the ground-engaging outer side in a thickness direction of the track.

32. The track claimed in claim 29, wherein the single layer of reinforcing fabric is closer to the ground-engaging outer side than to the inner side in a thickness direction of the track.

33. The track claimed in claim 29, wherein the single layer of reinforcing fabric is located such that a neutral area separating a region of compressive stress of the cross-section of the track and a region of tensile stress of the cross-section of the track is closer to the ground-engaging outer side than to the inner side in a thickness direction of the track.

34. The track claimed in claim 29, comprising a layer of cords embedded between the inner side and the ground-engaging outer side, the cords extending generally parallel to one another and in the longitudinal direction of the track.

35. The track claimed in claim 34, wherein the single layer of reinforcing fabric is located between the ground-engaging outer side and the layer of cords.

36. The track claimed in claim 34, wherein the single layer of reinforcing fabric is located between the inner side and the layer of cords.

37. The track claimed in claim 34, wherein the single layer of reinforcing fabric is spaced apart from the layer of cords in a thickness direction of the endless track.

38. The track claimed in claim 37, wherein a spacing of the single layer of reinforcing fabric and the layer of cords in the thickness direction of the track is greater than a thickness of the single layer of reinforcing fabric.

39. The track claimed in claim 34, wherein each of the cords comprises a plurality of strands.

40. The track claimed in claim 29, comprising a plurality of cross bars embedded between the inner side and the ground-engaging outer side, spaced apart from one another in the longitudinal direction of the track, and extending transversally to the longitudinal direction of the track.

41. The track claimed in claim 40, wherein the single layer of reinforcing fabric is located between the ground-engaging outer side and the cross bars.

42. The track claimed in claim 40, wherein the single layer of reinforcing fabric is located between the inner side and the cross bars.

43. The track claimed in claim 40, comprising a layer of cords embedded between the inner side and the ground-engaging outer side, the cords extending generally parallel to one another and in the longitudinal direction of the track.

44. The track claimed in claim 43, wherein the cross bars are located between the layer of cords and the ground-engaging outer side.

45. The track claimed in claim 43, wherein the single layer of reinforcing fabric is located between the layer of cords and the cross bars.

46. The track claimed in claim 40, wherein each of the cross bars comprises composite material.

47. The track claimed in claim 29, wherein the single layer of reinforcing fabric comprises reinforcing woven fabric.

48. The track claimed in claim 47, wherein the reinforcing woven fabric comprises nylon.

49. The track claimed in claim 29, wherein, when operated at a given speed, the track consumes less power than if the cross-section of the track had an additional layer of reinforcing fabric embedded between the inner side and the ground-engaging outer side.

50. The track claimed in claim 49, wherein the given speed is above 60 miles per hour.

51. The track claimed in claim 29, wherein respective ones of the traction projections are spaced apart from one another in a widthwise direction of the track.

52. The track claimed in claim 29, wherein each of the traction projections has a height that varies along a longitudinal axis of the traction projection.

53. The track claimed in claim 29, wherein the vehicle is a snowmobile and the track is a snowmobile track.

54. The track claimed in claim 29, wherein the vehicle is an all-terrain vehicle (ATV) and the track is an ATV track.

55. A snowmobile comprising the track claimed in claim 53.

56. An ATV comprising the track claimed in claim 54.

\* \* \* \* \*